United States Patent
Cariello

(10) Patent No.: US 11,625,333 B2
(45) Date of Patent: Apr. 11, 2023

(54) CONFIGURABLE FLUSH OPERATION SPEED

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/240,832

(22) Filed: Apr. 26, 2021

(65) Prior Publication Data

US 2022/0342826 A1 Oct. 27, 2022

(51) Int. Cl.

| | | |
|---|---|---|
| *G06F 12/08* | (2016.01) | |
| *G06F 13/16* | (2006.01) | |
| *G06F 9/30* | (2018.01) | |
| *G06F 12/0891* | (2016.01) | |
| *G06F 12/0811* | (2016.01) | |

(52) U.S. Cl.
CPC ...... *G06F 12/0891* (2013.01); *G06F 9/30047* (2013.01); *G06F 9/30101* (2013.01); *G06F 12/0811* (2013.01); *G06F 13/1668* (2013.01)

(58) Field of Classification Search
CPC ............. G06F 12/0891; G06F 9/30047; G06F 9/30101; G06F 12/0811; G06F 13/1668
See application file for complete search history.

(56) References Cited

U.S. PATENT DOCUMENTS

| | | | |
|---|---|---|---|
| 2016/0019149 A1* | 1/2016 | Sivaramakrishnan | ............ G06F 12/0811 711/122 |
| 2018/0181491 A1* | 6/2018 | DeLaurier | ............. G06F 12/084 |
| 2019/0065080 A1* | 2/2019 | Tanpairoj | ............. G06F 3/0688 |
| 2021/0011842 A1* | 1/2021 | Lee | ............. G11C 16/10 |

* cited by examiner

*Primary Examiner* — Masud K Khan
(74) *Attorney, Agent, or Firm* — Holland & Hart, LLP

(57) ABSTRACT

Methods, systems, and devices for configurable flush operation speed are described. Before executing a flush operation at a first portion of a cache including single-level cells (SLCs), a memory system may communicate parameters associated with data stored in the first portion of the cache to a host system. The host system may then identify another portion of the cache (e.g., including either SLCs or multi-level cells (MLCs)) for the flush operation based on the parameters and a speed of a flush operation associated with the other portions of the cache. The host system may indicate the identified portion of the cache to the memory system and the memory system may execute a flush operation at the first portion of the cache. For example, the memory system may write a subset of the data stored at the first portion of the cache to a second portion of the cache.

25 Claims, 7 Drawing Sheets

CONFIGURABLE FLUSH OPERATION SPEED

FIELD OF TECHNOLOGY

The following relates generally to one or more systems for memory and more specifically to configurable flush operation speed.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
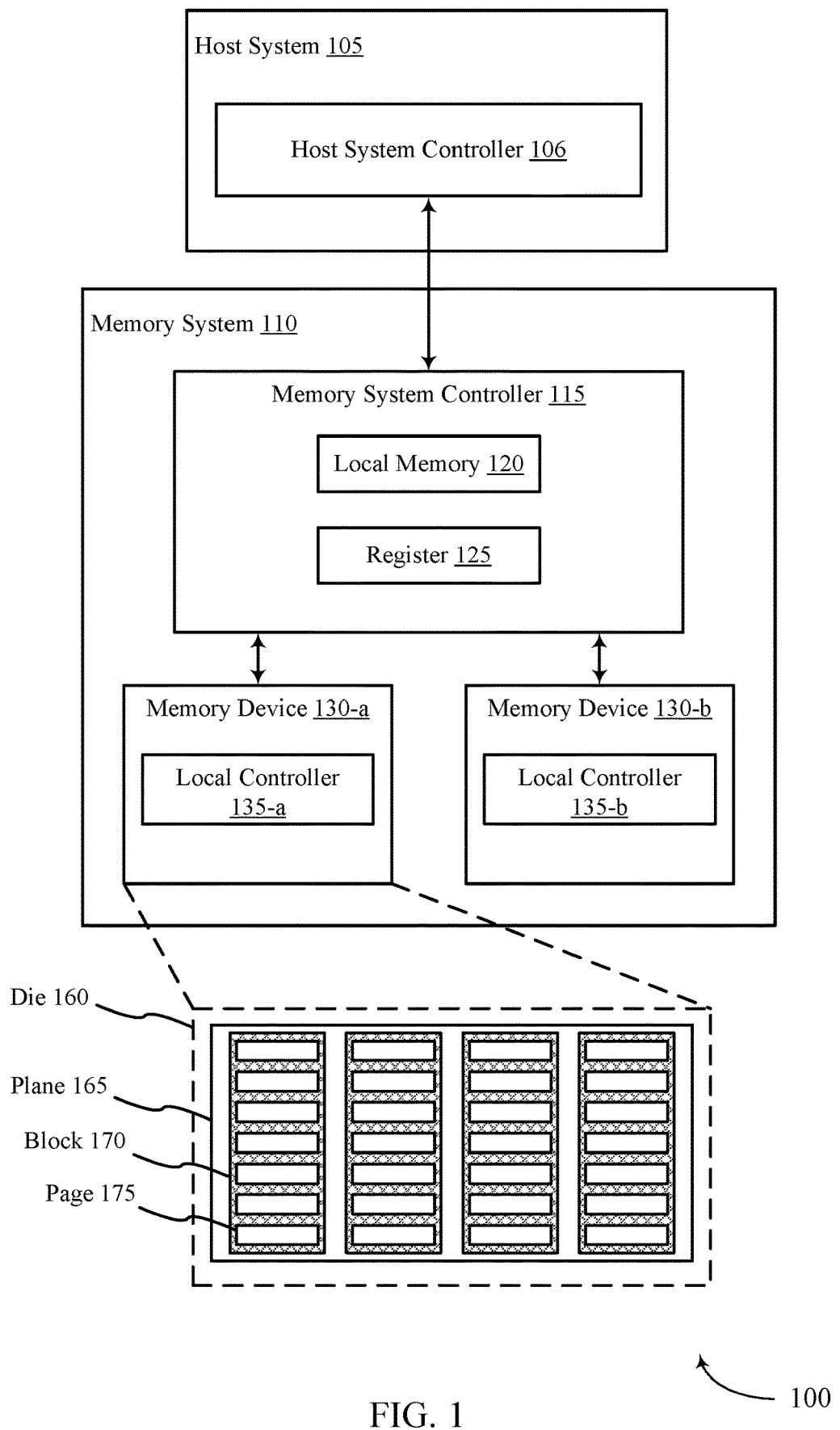
FIG. 1 illustrates an example of a system that supports configurable flush operation speed in accordance with examples as disclosed herein.

Some memory systems may include a cache including multiple blocks (e.g., multiple subsets) of memory cells (e.g., multiple portions). For example, a multi-level cache may include one or more single-level cell (SLC) portions and one or more multi-level cell (MLC) portions (e.g., dual-level cell, triple-level cell (TLC), quad-level cell (QLC), or penta-level cell (PLC) portions). In some examples, one of the portions may be utilized as a buffer (e.g., a write booster buffer). For example, an SLC portion may be utilized as the buffer. In this example, the memory system may receive data (e.g., from a host system) to store at a memory device within the memory system. Then, the memory system may buffer the data (e.g., received from the host system) in the SLC portion of the cache as opposed to other portions of the cache. In some instances (e.g., in response to the SLC portion of the cache reaching a threshold level such as being full or nearly full), the data written to the SLC portion may be flushed (e.g., moved) to another portion of the cache using a flush operation. In one example, the flush operation may include writing data to one or more SLC portions of the cache. Alternatively, the flush operation may include writing the data to one or more MLC portions of the cache. Different flush operations (e.g., flushing data to an SLC portion of the cache, flushing data to an MLC portion of the cache) may be associated with different characteristics. For example, flushing data from an SLC portion to a different SLC portion may occur more quickly compared to flushing data from an SLC portion to an MLC portion. Additionally, flushing data from an SLC portion to an MLC portion may be more efficient (e.g., may free up more space in the SLC portion) compared to flushing data from an SLC portion to another SLC portion. In some cases, one flush operation may be better than another flush operation depending on a desired speed of completing the flush operation or an efficiency of the flush operation.

As described herein, the memory system may utilize methods for determining a flush operation to be performed based on or in response to a speed or an efficiency associated with different options for performing the flush operation. For example, a memory system may determine a flush operation to perform on an SLC portion of a cache based on or in response to receiving an indication of a cache portion for the flush operation from a host system. For example, the host system may evaluate one or more parameters associated with the memory system to determine whether a first flush operation (e.g., that will be completed sooner than if a different type of second flush operation were performed, a faster flush operation) or a second flush operation (e.g., that will be completed later than if a different type of first flush operation were performed, a more efficient flush operation) should be performed. After determining whether a first flush operation or a second flush operation should be performed, the host system, as one example, may indicate the cache portion for the flush operation to the memory system. For example, the host system may indicate one or more SLC portions of the cache to the memory system should be used for a first (e.g., faster) flush operation. Additionally or alternatively, the host system may indicate one or more MLC portions of the cache to the memory system for a second (e.g., more efficient) flush operation. Based on or in response to receiving the indication of the one or more cache portions from the host system, the memory system may perform the flush operation(s). For example, the memory system may write data from the SLC portion (e.g., acting as the buffer) to another portion of the cache. Thus, the host system or the memory system (or both) may evaluate one or more parameters associated with the memory system to determine a type of flush operation to perform (e.g., a fast flush operation, an efficient flush operation).

Features of the disclosure are initially described in the context of systems as described with reference to FIGS. 1 through 2. Features of the disclosure are described in the context of a process flow as described with reference to FIG. 3. These and other features of the disclosure are further illustrated by and described with reference to an apparatus diagram and flowcharts that relate to configurable flush operation speed as described with reference to FIGS. 4-7.

FIG. 1 illustrates an example of a system 100 that supports configurable flush operation speed in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally or alternatively, a NAND memory device 130 may include memory cells configured to each store multiple bits of information, which may be referred to as MLCs if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples, the memory system 110 may include a cache. For example, the local memory 120 may be an example of or may include a cache. In another example, one of the memory devices 130 may be or may include a cache. In either example, the cache may be divided into multiple blocks 170 or portions (e.g., as illustrated with reference to memory device 130-a). In some cases (e.g., for a multi-level cache design), the various blocks of the cache may correspond to different cell types (e.g., architectures). For example, a first block 170 may be an example of an SLC portion and a second block 170 may be an example of an MLC portion. Moreover, in some examples, one or more of the blocks 170 of the cache may be used as a buffer (e.g., write booster buffer). The memory system 110 may, in some examples, utilize the buffer for intermediate data storage between the host system 105 and the memory system 110. That is, the memory system 110 may write data to the buffer before storing the data at a memory device 130.

The memory system 110 may perform a flush operation to move valid data from a first block 170 of the cache to a second block 170 of the cache. In some cases, the flush operation may clear the first block 170 of the cache (e.g., corresponding to the buffer) and enable the memory system 110 to store additional data in the first block 170 of the cache (e.g., after the flush operation). In some cases, characteristics of the flush operation may be based on a type of cell architecture associated with the second block 170 of the cache. For example, a flush operation associated with a garbage collection of valid data to a block 170 including SLCs may be relatively faster compared to a flush operation associated with a garbage collection of valid data to a block 170 including MLCs (e.g., such as dual-level cells, TLCs, QLCs). Additionally, a flush operation associated with a garbage collection of valid data to a block 170 including MLCs may be more efficient (e.g., may clear more data from the first block 170) compared to a flush operation associated with a garbage collection of valid data to another block 170 of the SLCs pool.

In the example of system 100, the host system 105 may receive an indication of one or more parameters from the memory system 110 and the host system 105 may select a flush operation (e.g., a relatively fast flush operation, a relatively more efficient flush operation) based on or in response to the one or more parameters. In some examples, the one or more parameters may be associated with the volume or distribution of data stored within the block 170 of the cache (e.g., may indicate a higher or lower volume of data stored, may indicate a higher concentration of a distribution of data or a lower concentration of a distribution of data stored, may indicate a concentration of valid data stored) or the one or more parameters may be associated with a time estimation (e.g., may indicate the estimated time it may take to free up a given amount of the buffer using different types of flush operations). Additionally, the host system 105 may utilize past data, such as historical parameter information (e.g., in combination with one or more techniques for analyzing the information such as machine learning) to select the flush operation.

Once the host system 105 selects the flush operation to be performed, the host system 105 may indicate the selected flush operation to the memory system 110. For example, the host system controller 106 may write an indication of the selected flush operation to the register 125 (e.g., sending a command to the memory system 110 to write the indication to the register 125). The memory system controller 115 may poll the register 125 to identify the selected flush operation and perform a flush operation based on the indicated selected flush operation. In another example, the host system controller 106 may send a command indicating the selected flush operation to the memory system controller 115 and the memory system controller 115 may perform a flush operation based on or in response to the command, where the command may indicate whether to perform a first flush operation or a second flush operation. As such, memory system 110 may selectively perform one or more faster or more efficient flush operations based on or in response to one or more parameters associated with the cache and memory system. In some cases, selectively performing faster or more efficient flush operations may increase an overall processing efficiency and in some cases, improve user experience.

The system 100 may include any quantity of non-transitory computer readable media that support configurable flush operation speed. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
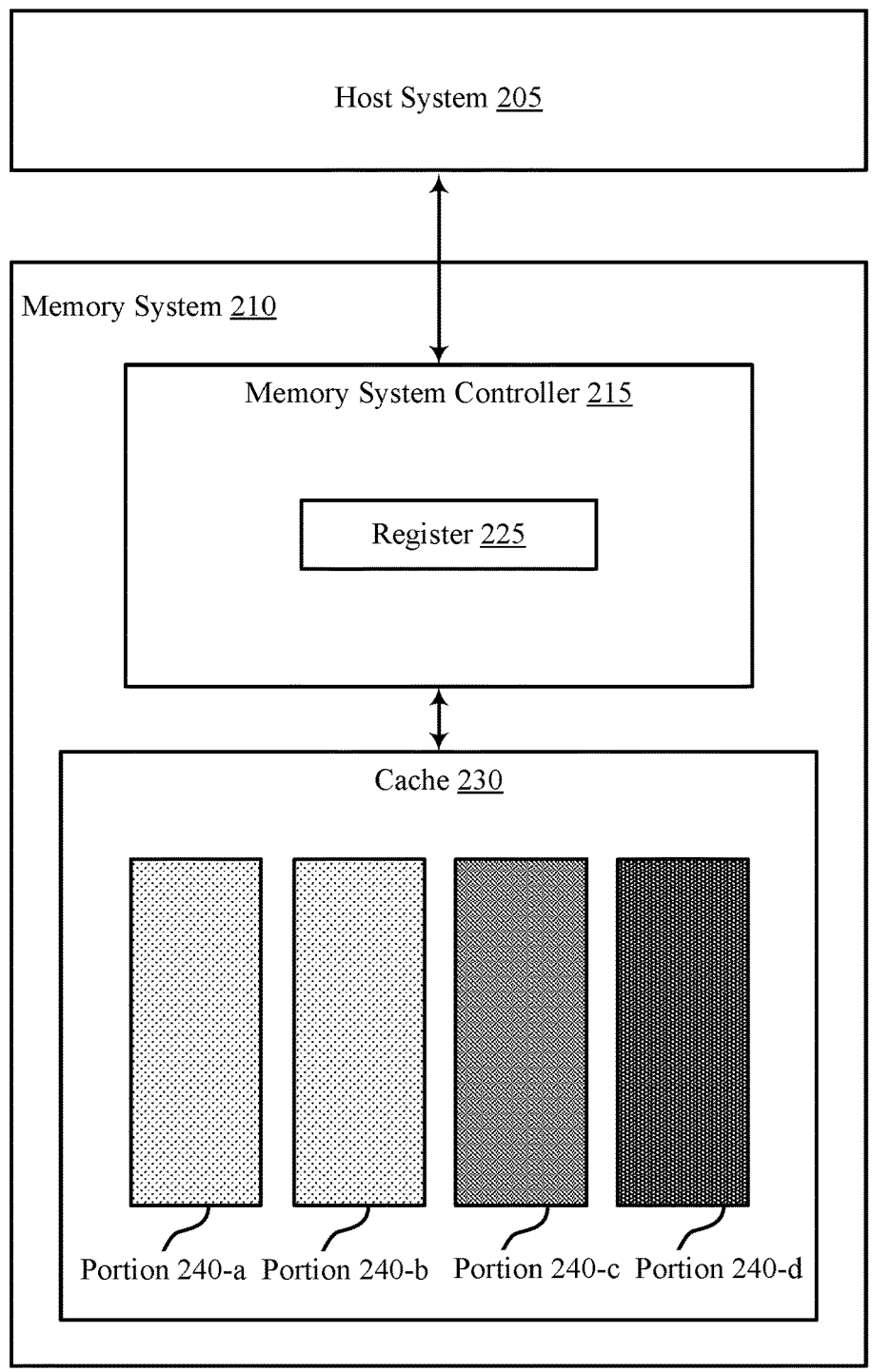
FIG. 2 illustrates an example of a system that supports configurable flush operation speed in accordance with examples as disclosed herein.

FIG. 2 illustrates an example of a system 200 that supports configurable flush operation speed in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

In some examples, the memory system 210 may include a cache 230 which may be divided into multiple portions 240. For example, cache 230 may include portion 240-*a*, portion 240-*b*, portion 240-*c*, and portion 240-*d*. Portions 240 may be examples of blocks 170 as described with reference to FIG. 1. In some examples, the cache 230 may be an example of a multi-level cache design. That is, the cache 230 may include portions 240 associated with different cell architectures. For example, portion 240-*a* and portion 240-*b* may in some examples include SLCs, and portions 240-*c* and 240-*d* may include MLCs. Specifically, portion 240-*c* may include TLCs and portion 240-*d* may include QLCs.

In some examples, the memory system 210 may utilize one or more of the portions 240 of the cache 230 as a buffer (e.g., a write booster buffer). For example, the memory system 210 may utilize portion 240-*a* as a buffer. In some examples, the memory system 210 may rely on a buffer to increase a performance of the memory system 210. For example, in response to the host system 205 transmitting a write command to the memory system 210 including a set of data to be stored at the memory system 210, the memory system 210 may write the set of data to the buffer (e.g., portion 240-*a* of the cache 230). Then, if the buffer's space used satisfies a threshold, for example becomes full or nearly full, the memory system 210 may perform a flush operation on the buffer to write the data stored in the buffer to another portion 240 of the cache 230. Utilizing a portion 240 of the cache 230 that includes SLCs as the buffer may increase write performance compared to utilizing, for example, a portion 240 of the cache 230 that includes MLCs because a programming time associated with MLCs may be greater compared to a programming time associated with SLCs. Additionally, SLCs may be associated with more reliability compared to MLCs. More generally, utilizing a portion 240 of the cache 230 that includes a lower order of cells (e.g., SLCs, dual-level cells) as the buffer may increase write performance compared to utilizing, for example, a portion 240 of the cache 230 that includes a higher order of cells (e.g., TLCs, QLCs) because a programming time associated with a higher order of cells may be greater compared to a programming time associated with a lower order of cells. Additionally, a lower order of cells may be associated with more reliability compared to a higher order of cells.

The memory system 210 may perform maintenance operations on one or more portions 240 of the cache 230. For example, the memory system 210 may perform a flush operation, or a garbage collection operation. In response to the memory system 201 performing a flush operation on a portion 240 of the cache 230, the memory system 210 may write a subset of the data stored within the portion 240 (e.g., the valid data stored in the portion 240) to another portion 240 of the cache 230. For example, performing a flush operation may include moving data from the first portion 240-*a* of the cache 230 to another portion 240 of the cache 230 (e.g., portion 240-*b*, portion 240-*c*, or portion 240-*d*). Similarly, performing a garbage collection operation may include moving valid data from a first portion 240-*a* of the cache 230 to another portion 240 of the cache 230 and erasing the data stored in the first portion 240-*a* of the cache 230.

A speed and efficiency of flush operations and garbage collection operations performed on a portion 240 of the cache 230 (e.g., portion 240-*a*) may depend on, among other aspects, a type of memory cells included in the portion 240 of the cache 230 to which the data (e.g., stored in the portion 240-*a*) is being written. For example, moving data from portion 240-*a* to portion 240-*b* that includes SLCs may occur relatively fast compared to moving data from portion 240-*a* to portion 240-*c* that includes TLCs or portion 240-*d* that includes QLCs. That is, programming an SLC may be faster than programming a TLC or QLC, or more generally programming a lower order cell may be faster than programming a higher order cell. Additionally, moving data from portion 240-*a* to portion 240-*b* that includes SLCs may be less efficient than moving data from portion 240-*a* to portion 240-*c* that includes TLCs or portion 240-*d* that includes QLCs. For example, a capacity of data storage of the portions 240-*c* and 240-*d* may be larger than a capacity for data storage of the portions 240-*a* and 240-*c* (e.g., due to MLCs storing more bits of data than SLCs). Thus, a larger amount of data may be moved to portions 240-*c* and 240-*d* (that includes MLCs) compared to portion 240-*b* (that includes SLCs). As such, moving data to portion 240-*c* (e.g., including SLCs) may correspond to a relatively fastest flush operation, moving data to portion 240-*d* (e.g., including QLCs) may correspond to a relatively slowest flush operation, and moving data to portion 240-*c* (e.g., including TLCs) may correspond to middle speed flush operation.

The memory system 210 may be configured to select a flush operation type (e.g., a relatively faster flush operation, a relatively slow flush operation) for execution at a portion 240 of the cache 230 (e.g., portion 240-*a*) based on or in response to one or more parameters associated with the cache 230. Additionally or alternatively, the host system 205 may be configured to indicate a recommended flush operation type to the memory system 210 in response to the parameters associated with the memory system 210 and the cache 230. For example, the host system 205 may receive, from the memory system 210, an indication of one or more parameters related to the portion 240-*a*. For example, the memory system 210 may write an indication of the one or more parameters to the register 225. The host system 205 may poll the register to receive the indication of the one or more parameters from the memory system 210.

The host system 205 may determine a flush operation (e.g., faster, middle, or slower) based on or in response to the parameters. Then the host system 205 may be configured to indicate (e.g., send) a recommended flush operation type to the memory system 210 in response to the parameters associated with the memory system 210 and the cache 230. The memory system 210 may determine whether to perform the recommended flush operation type indicated by the host system 205 or whether to perform a flush operation different than the recommended flush operation type. For example, the memory system 210 may determine to perform a flush operation different from the recommended flush operation type if the memory system 210 determines that the one or more parameters were incorrectly indicated to the host system 205 or if the one or more parameters indicated to the host system 205 are no longer valid. The parameters may include a logic saturation level, a fragmentation level, or a valid count distribution associated with the portion 240-*a*. The logic saturation level may indicate a percentage of the portion 240-*a* storing data. If the logic saturation level is high (e.g., above a threshold), the host system 205 may select a slower flush operation (e.g., a more efficient flush operation) to enable a relatively large amount of data to be moved from the portion 240-*a* during the flush operation. The fragmentation level may indicate a sparsity of data storage within the portion 240-*a*. If the fragmentation level is high (data is very sparse), the host system 205 may select a faster flush to enable faster programming of the fragmented data and because a quantity of data to be moved from the portion 240-*a* may be relatively small. Valid count distribution may indicate a physical occupancy of the buffer. If the valid count distribution is low and the logic saturation is high, the host system 205 may select a fast flush.

The host system 205 may additionally select or determine to indicate a proposed flush operation based on (e.g., in response to) one or more additional parameters (e.g., in addition to the parameters indicated by the memory system 210, previously determined by the host system 205, or another source). For example, the host system 205 may evaluate a battery level of the memory system 210 and a location of the system 200. That is, the host system 205 may select a slower flush operation (e.g., to conserve power) in cases that the batter level of the memory system 210 is below a threshold low or in cases that a location of the system 200 is not associated with a power source (e.g., a remote location or an unknown location as opposed to a home location or a known location). Additionally, the host system 205 may rely on historical data (e.g., including heuristics on a user usage) and utilize a machine learning algorithm (e.g., artificial intelligence), among other techniques, to predict a timing associated with the flush operation (e.g., an active/idle time ratio). In some examples, the predicted timing may be based on or in response to one or more of battery level, real time location, etc.

Once the host system 205 selects the flush operation, the host system 205 may indicate the selected flush operation to the memory system 210. For example, the host system 205 may indicate a portion 240 of the cache 230 to move data stored in the portion 240-*a*. For example, if the host system 205 selects a faster flush operation, the host system 205 may indicate portion 240-*b* (e.g., including SLCs) to the memory system 210. Additionally, if the host system 205 determines a middle speed flush should be performed, the host system 205 may indicate portion 240-*c* (e.g., including TLCs) to the memory system 210. Moreover, if the host system 205 determines a slower flush should be performed, the host system 205 may indicate a portion 240-*d* (e.g., including QLCs) to the memory system 210. In some examples, the host system 205 may indicate the portion 240 of the cache 230 via a command (e.g., by transmitting a flush command to the memory system 210). In another example, the host system 205 may indicate the portion 240 of the cache 230 by writing an indication of the selected portion 240 to a register 225 coupled with the memory system 210. In some cases, the memory system controller 215 may poll the register 225 to determine which portion 240 of the cache 230 is indicated by the host system 205. In some cases, the register 225 may be associated with a set of registers 225, where each register 225 is associated with one of the one or more additional portions of the cache. For example, a first register 225 may be associated with the portion 240-*b*, a second register 225 may be associated with portion 240-*c*, and a third register 225 may be associated with the portion 240-*d*. Here, the host system 205 may indicate the portion 240 of the cache 230 by writing an indication to one of the set of registers 225 associated with the indicated portion 240 of the cache 230.

After receiving the indication of the selected flush operation from the host system 205, the memory system 210 may perform a flush operation at the portion 240-*a*. In some cases, the memory system 210 may perform the flush operation indicated by the host system 205 (e.g., by writing data from the portion 240-*a* to the portion 240 of the cache 230 indicated by the host system 205). In some other cases, the memory system 210 may perform a flush operation different than the flush operation indicated by the host system 205. For example, the host system 205 may indicate a faster flush operation (e.g., associated with the portion 240-*b*) and the memory system 210 may determine to perform a middle speed flush operation (e.g., associated with the portion 240-*c*) instead. For example, the memory system may determine to perform the middle speed flush operation (e.g., instead of the indicated fast flush operation) based on a valid percentage of the portion 240-*a* (e.g., a physical saturation) being high and determining that an efficiency of the faster flush operation (e.g., an amount of the valid data of the portion 240-*a* moved during the faster flush operation) is not high enough to flush the portion 240-*a*. Additionally, the memory system may determine to perform the middle speed operation (e.g., instead of the indicated fast flush operation) based on a predicted power consumption, based on or in response to the portion 240-*a* having a high valid count distribution (e.g., 90%), or some other parameters or factors.

Figure 3:
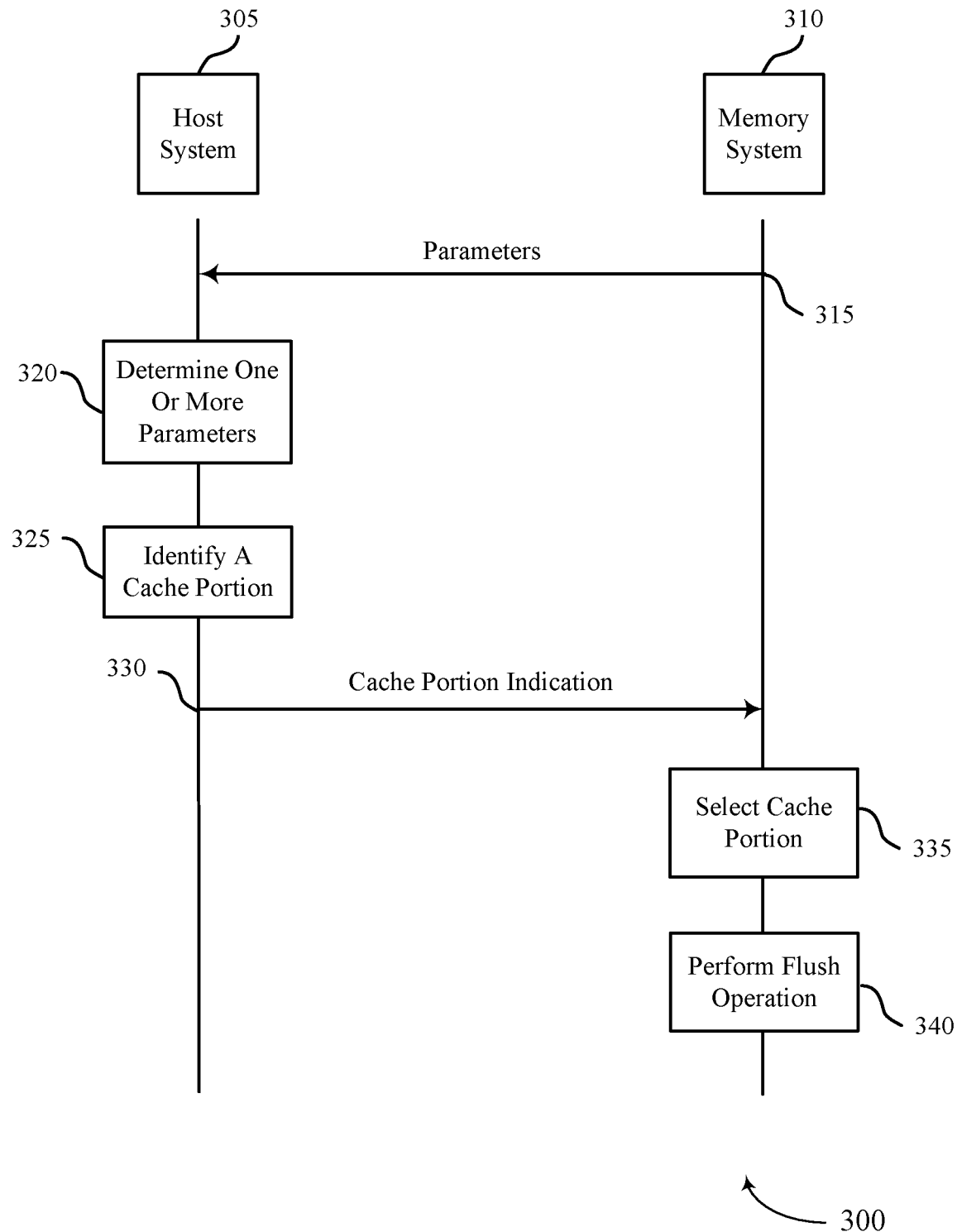
FIG. 3 illustrates an example of a process flow that supports configurable flush operation speed in accordance with examples as disclosed herein.

FIG. 3 illustrates an example of a process flow 300 that supports configurable flush operation speed in accordance with examples as disclosed herein. In some examples, the process flow 300 may implement or may be implemented by aspects of a system 100 or a system 200. For example, the process flow 300 may include a host system 305 and a memory system 310, which may be examples of host systems and memory systems as described herein. The memory system 310 may include a cache having different portions (e.g., a first portion with SLCs, and additional portions with SLCs or MLCs). The process flow 300 may involve a host system 305 selecting a flush operation based on or in response to one or more parameters and sending an indication of the selected flush operation to a memory system 310, where the memory system 310 may perform or not perform the flush operation selected by the host system 305. Alternative examples of the following may be implemented, where some steps are performed in a different order than described or are not performed at all. In some cases, steps may include additional features not mentioned below, or further steps may be added.

Aspects of the process flow 300 may be implemented by a controller, among other components. Additionally or alternatively, aspects of the process flow 300 may be implemented as instructions stored in memory (e.g., firmware stored in a memory coupled with a host system 305 or a memory system 310). For example, the instructions, in response to being executed by a controller (e.g., host system controller), may cause the controller to perform at least some or all of the operations of the process flow 300.

At 315, one or more parameters may be communicated. For example, at 315, one or more parameters may be communicated to the host system 305 by memory system 310 (e.g., via a register). For example, the memory system 310 may determine a fragmentation level or a logic saturation (or both) associated with a first portion of a cache of the memory system (e.g., SLC portion of a cache included in the memory system 310). In some examples, the memory system 310 may indicate the fragmentation level (e.g., via a bFragmentationLevel parameter) and the logic saturation (e.g., via a bLogicSaturation parameter) to the host system 305 by programming a register to store a value (e.g., a manufacturer default value (MDV)) indicating the one or more parameters. For example, the memory system 310 may indicate a low fragmentation level of the first portion of the cache (e.g., the buffer) by programming the register to store a value of '0h' for a bFragmentationLevel parameter. Additionally, the memory system 310 may indicate a higher fragmentation level of the first portion of the cache (e.g., the buffer), for example compared to a threshold, by programming the register to store a value of 'FFH' for the bFragmentationLevel parameter. In another example, the memory system 310 may indicate a lower saturation level of the first portion of the cache (e.g., the buffer), for example compared to a threshold, by programming the register to store a value of '0h' for the bLogicSaturation parameter. Additionally, the memory system 310 may indicate 1%, 25%, 50%, 75%, and 100% logic saturation levels of the first portion of the cache by programming the register to store values of '1h,' '25h,' '50h,' '75h,' and '100h,' respectively, for the bLogicSaturation parameter.

At 320, the one or more parameters may be identified. For example, at 320, the one or more parameters may be identified by the host system 305. In some examples, the host system 305 may identify the one or more parameters received from the memory system 310 (e.g., fragmentation level, logic saturation, valid count distribution, etc.) by polling the register coupled with the memory system 310. Additionally or alternatively, the host system 305 may determine one or more additional parameters associated with the memory system 310. For example, the host system 305 may identify a battery life associated with the memory system 310, a current location of the memory system 310, data associated with one or more previous flush operations at the memory system 310, a computational power of the memory system 310, or any combination thereof.

At 325, a portion of the cache (e.g., for a flush operation) may be identified. For example, at 325, a portion of the cache (e.g., for a flush operation) may be identified by the host system 305. That is, the host system 305 may identify a portion of the cache to which the memory system 310 writes data from a first portion of the cache (e.g., the buffer, a portion of the cache including SLCs) in response to executing a flush operation on the first portion of the cache. In some cases, the host system 305 may identify a portion of the cache including SLCs for a fast flush operation, a portion of the cache including TLCs for a middle speed flush operation, and a portion of the cache including QLCs for a slower flush operation. In some examples, the host system 305 may identify the portion of the cache for the flush operation based on or in response to the one or more parameters determined at 320. For example, if the host system 305 determines that the first portion of the cache has a high fragmentation level, the host system 305 may identify a portion of the cache including SLCs for a faster flush operation. In another example, if the host system 305 determines that a battery level associated with the memory system 310 is low, the host system 305 may identify a portion of the cache including QLCs for a slower flush operation (e.g., that consumes less power).

At 330, a cache portion indication may be received. For example, at 330, a cache portion indication may be received by a memory system 310. That is, the host system 305 may communicate, to the memory system 310, an indication of the portion of the cache (e.g., identified by the host system 305 for the flush operation at 325). In one example, the host system 305 may indicate the portion of the cache by transmitting a command to execute the flush operation at the memory system, where the command includes the indication of the portion of the cache. In another example, the host system 305 may indicate the portion of the cache by programming a register to store the indication of the portion of the cache for the flush operation. Here, the memory system 310 may read the register to receive the indication of the portion of the cache for the flush operation from the host system 305. In some cases, the host system 305 may indicate the portion of the cache for the flush operation by indicating a speed (e.g., via a bWBFlushSpeed parameter) corresponding to a destination (e.g., or portion of the cache) of the flush operation. For example, the host system may set the bWBFlushSpeed parameter to a value of '0h' to indicate no flush operation, to a value of ' 1h' to indicate a fast flush operation (e.g., corresponding to a garbage collection into other SLCs), to a value of '2h' to indicate a normal flush operation (e.g., corresponding to a garbage collection into TLCs), and to a value of '3h' to indicate a slow flush operation (e.g., corresponding to a garbage collection into QLCs).

At 335, a cache portion for the flush operation (e.g., a cache portion for which the valid data from the first portion of the cache may be moved to) may be selected. For example, at 335, the memory system 310 may select a destination cache portion for the flush operation, where the memory system 310 moves the valid data from the first portion of the cache (e.g., the buffer) to the selected cache portion. That is, the memory system 310 may select, from the additional portions of the cache (e.g., other than the first portion of the cache or the buffer), a second portion of the cache for performing the flush operation. In some cases, the second portion of the cache may be the same as the portion of the cache indicated by the host system 305 at 330. In some other cases, the second portion of the cache may be different than the portion of the cache indicated by the host system 305 at 330. For example, the host system 305 may indicate a portion of the cache associated with a fast flush operation and the memory system 310 may select a portion of the cache associated with a normal flush operation.

At 340, the flush operation may be executed. For example, at 340, the flush operation may be executed by the memory system 310. For example, the memory system write a subset of the data (e.g., including valid data) stored in the first portion of the cache to a second portion of the cache based on or in response to receiving the indication of the portion of the cache from the host system 305. In some cases, the memory system 310 erase the data stored in the first portion of the cache after writing the subset of the data to the second portion of the cache.

Figure 4:
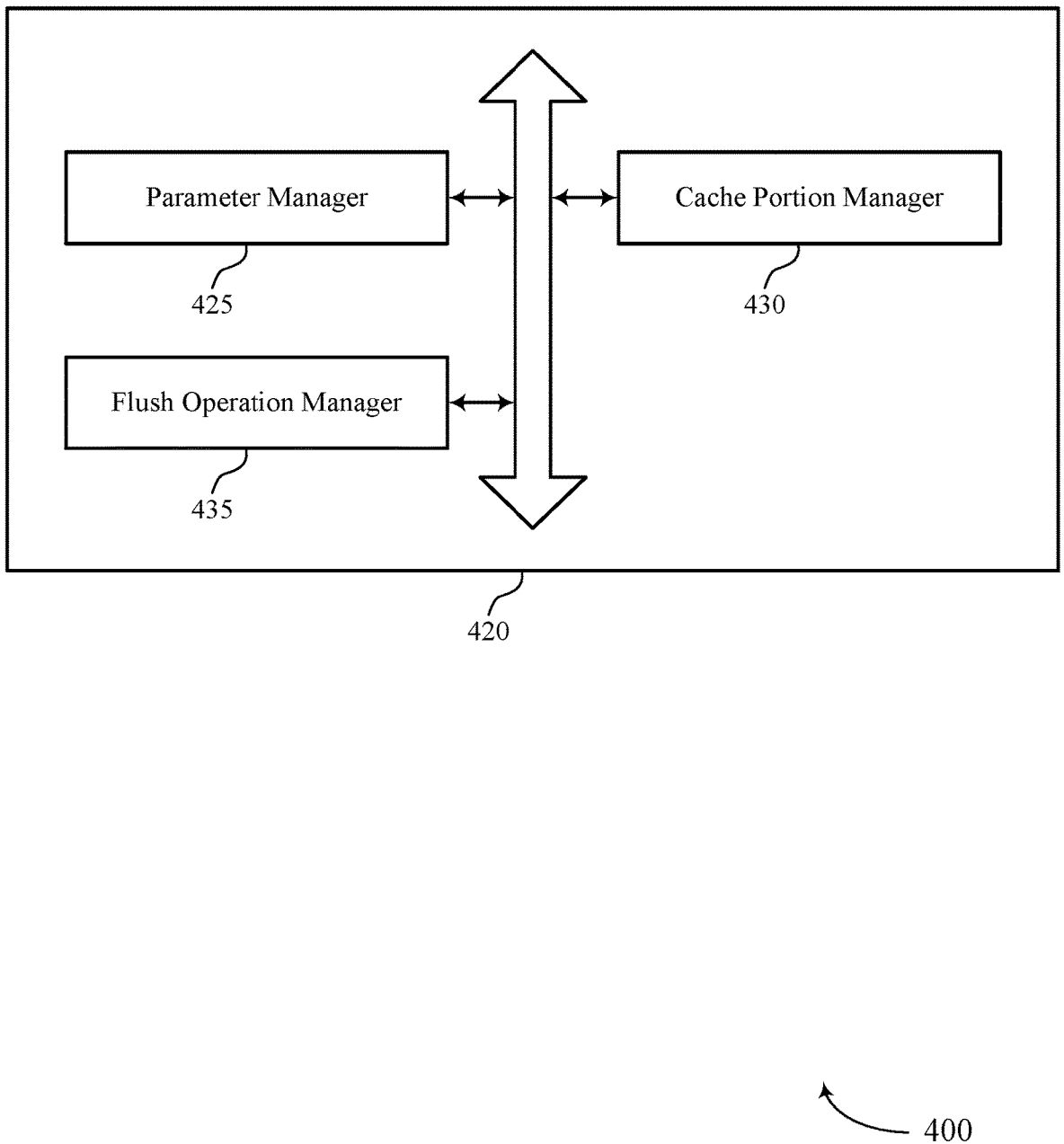
FIG. 4 shows a block diagram of a memory system that supports configurable flush operation speed in accordance with examples as disclosed herein.

FIG. 4 shows a block diagram 400 of a memory system 420 that supports configurable flush operation speed in accordance with examples as disclosed herein. The memory system 420 may be an example of aspects of a memory system as described with reference to FIGS. 1 through 3. The memory system 420, or various components thereof, may be an example of means for performing various aspects of configurable flush operation speed as described herein. For example, the memory system 420 may include a parameter manager 425, a cache portion manager 430, a flush operation manager 435, or any combination thereof. Each of these components may communicate, directly or indirectly, with one another (e.g., via one or more buses).

The parameter manager 425 may be configured as or otherwise support a means for communicating, to a host system, one or more parameters associated with data stored in a first portion of a cache of the memory system, the cache including the first portion having a plurality of SLCs and one or more additional portions having a plurality of SLCs or a plurality of MLCs. The cache portion manager 430 may be configured as or otherwise support a means for receiving, from the host system and based at least in part on communicating the one or more parameters, an indication of a portion of the cache in the one or more additional portions for a flush operation. The flush operation manager 435 may be configured as or otherwise support a means for writing, based at least in part on executing the flush operation, a subset of the data stored in the first portion of the cache to a second portion of the cache in the one or more additional portions of the cache based at least in part on receiving the indication of the portion of the cache.

In some examples, to support writing the subset of the data to the second portion, the flush operation manager 435 may be configured as or otherwise support a means for writing the subset of the data to the indicated portion of the cache.

In some examples, the cache portion manager 430 may be configured as or otherwise support a means for selecting, from the one or more additional portions of the cache, the second portion different than the indicated portion based at least in part on receiving the indication, where writing the subset of the data to the second portion is based at least in part on the selecting.

In some examples, selecting the second portion is based at least in part on a first speed of the flush operation associated with the second portion, a second speed of the flush operation associated with the indicated portion, a first amount of available space within the second portion, a second amount of available space within the indicated portion, or any combination thereof.

In some examples, the indication of the portion of the cache includes a value corresponding to one of a plurality of speeds for the flush operation. In some examples, each of the one or more additional portions is associated with a respective one the plurality of speeds.

In some examples, a first additional portion of the cache in the one or more additional portions having a plurality of SLCs is associated with a first speed for the flush operation from the plurality of speeds. In some examples, a second additional portion of the cache in the one or more additional portions having a plurality of MLCs is associated with a second speed for the flush operation from the plurality of speeds, the first speed being faster than the second speed.

In some examples, the one or more parameters include an indication of a fragmentation of the data stored in the first portion of the cache, an indication of a percentage of the first portion of the cache storing valid data, or both.

In some examples, to support receiving the indication, the cache portion manager 430 may be configured as or otherwise support a means for reading an indication of the portion of the cache stored at a register coupled with the memory system.

In some examples, to support receiving the indication, the cache portion manager 430 may be configured as or otherwise support a means for reading an indication of the portion of the cache stored at a set of registers coupled with the memory system, where each register of the set of registers is associated with one of the one or more additional portions of the cache.

In some examples, to support receiving the indication, the cache portion manager 430 may be configured as or otherwise support a means for receiving a command to execute the flush operation, where the command includes the indication of the portion of the cache for the flush operation.

In some examples, to support communicating the one or more parameters, the parameter manager 425 may be configured as or otherwise support a means for writing an indication of the one or more parameters to a register coupled with the memory system.

In some examples, to support executing the flush operation, the flush operation manager 435 may be configured as or otherwise support a means for identifying the subset of the data stored in the first portion of the cache based at least in part on the subset of the data including valid data, where writing the subset of the data is based at least in part on the identifying. In some examples, to support executing the flush operation, the flush operation manager 435 may be configured as or otherwise support a means for erasing the data stored in the first portion of the cache based at least in part on writing the subset of the data to the second portion of the cache.

Figure 5:
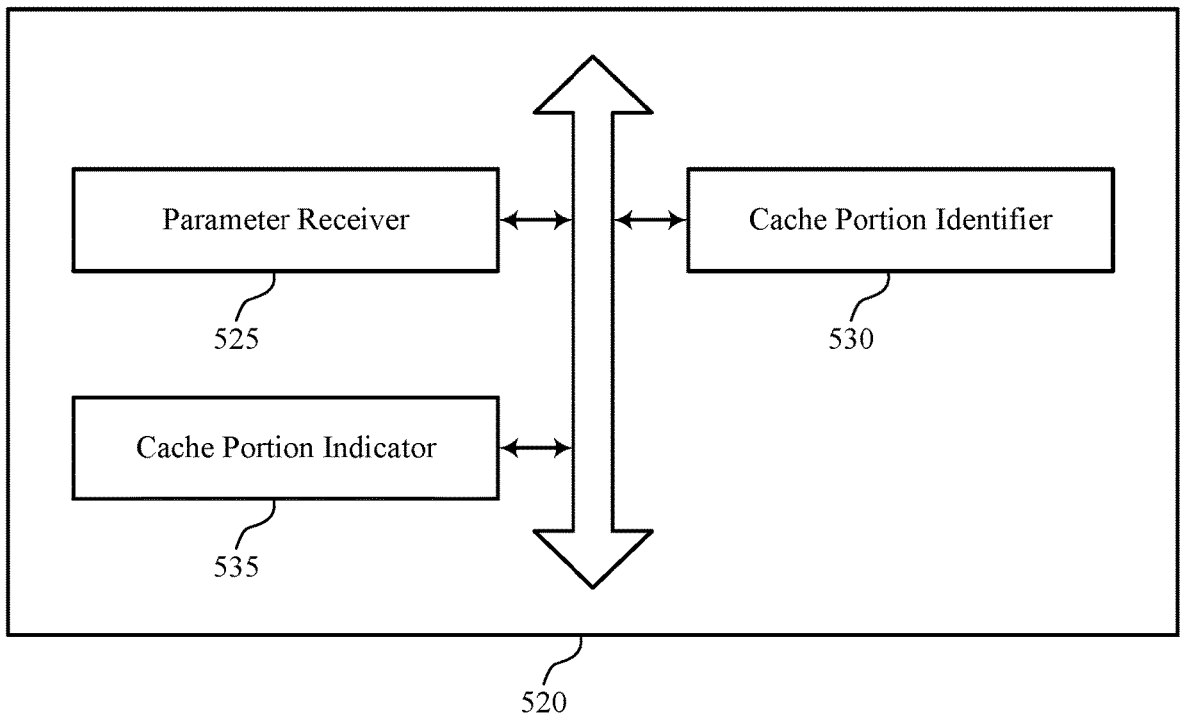
FIG. 5 shows a block diagram of a host system that supports configurable flush operation speed in accordance with examples as disclosed herein.

FIG. 5 shows a block diagram 500 of a host system 520 that supports configurable flush operation speed in accordance with examples as disclosed herein. The host system 520 may be an example of aspects of a host system as described with reference to FIGS. 1 through 3. The host system 520, or various components thereof, may be an example of means for performing various aspects of configurable flush operation speed as described herein. For example, the host system 520 may include a parameter receiver 525, a cache portion identifier 530, a cache portion indicator 535, or any combination thereof. Each of these components may communicate, directly or indirectly, with one another (e.g., via one or more buses).

The parameter receiver 525 may be configured as or otherwise support a means for receiving, from a memory system, one or more parameters associated with data stored in a first portion of a cache of the memory system, the cache including the first portion having a plurality of SLCs and one or more additional portions having a plurality of SLCs or a plurality of MLCs. The cache portion identifier 530 may be configured as or otherwise support a means for identifying a portion of the cache in the one or more additional portions for a flush operation performed at the memory system based at least in part on the one or more parameters. The cache portion indicator 535 may be configured as or otherwise support a means for indicating, to the memory system, the identified portion of the cache for the flush operation.

In some examples, to support indicating the identified portion of the cache, the cache portion identifier 530 may be configured as or otherwise support a means for writing a value to a register coupled with the memory system, where the value indicates the identified portion of the cache.

In some examples, to support indicating the identified portion of the cache, the cache portion identifier 530 may be configured as or otherwise support a means for writing a value to a set of registers coupled with the memory system, where each register of the set of registers is associated with one of the one or more additional portions of the cache, and writing the value to one of the set of registers indicates the identified portion of the cache based on which of the one or more additional portions of the cache the one register is associated with.

In some examples, to support indicating the identified portion of the cache, the cache portion indicator 535 may be configured as or otherwise support a means for transmitting a command to execute the flush operation, where the command indicates the identified portion of the cache for the flush operation.

In some examples, to support identifying the portion of the cache for the flush operation, the cache portion identifier 530 may be configured as or otherwise support a means for identifying the portion of the cache based at least in part on a speed of the flush operation associated with the identified portion.

In some examples, to support receiving the one or more parameters, the parameter receiver 525 may be configured as or otherwise support a means for polling a register at the memory system, where the register stores an indication of the one or more parameters.

In some examples, the indication of the portion of the cache includes a value corresponding to one of a plurality of speeds for the flush operation. In some examples, each of the one or more additional portions is associated with a respective one the plurality of speeds.

In some examples, a first additional portion of the cache in the one or more additional portions having a plurality of SLCs is associated with a first speed for the flush operation from the plurality of speeds. In some examples, a second additional portion of the cache in the one or more additional portions having a plurality of MLCs is associated with a second speed for the flush operation from the plurality of speeds, the first speed being faster than the second speed.

In some examples, the one or more parameters include an indication of a fragmentation of the data stored in the first portion of the cache, an indication of a percentage of the first portion of the cache storing valid data, or both.

In some examples, the cache portion indicator 535 may be configured as or otherwise support a means for identifying the portion of the cache for the flush operation based on or in response to one or more additional parameters, where the one or more additional parameters include a battery life associated with the memory system, a current location of the memory system, data associated with one or more previous flush operations at the memory system, a computational power of the memory system, or any combination thereof.

Figure 6:
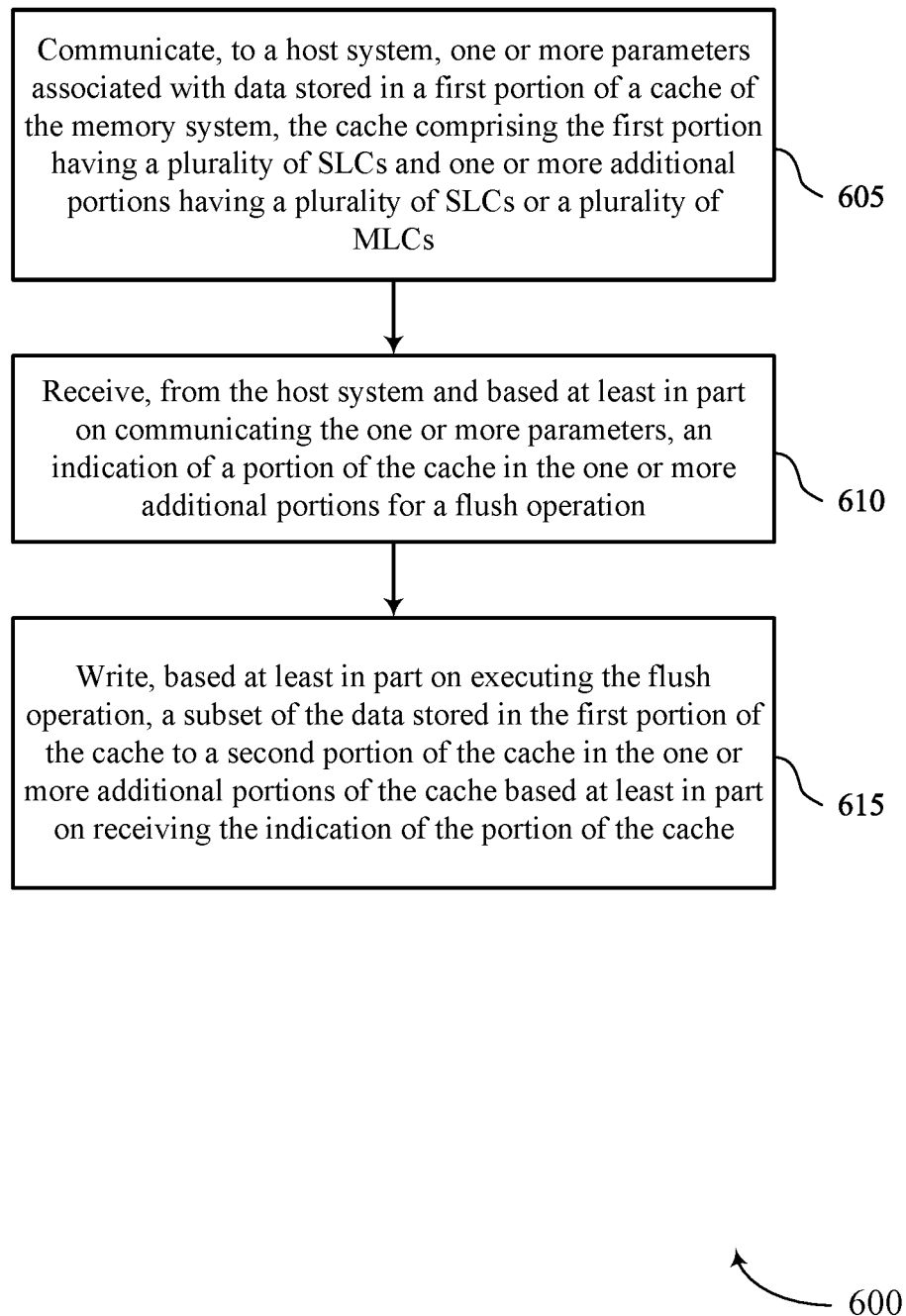
FIGS. 6 and 7 show flowcharts illustrating a method or methods that support configurable flush operation speed in accordance with examples as disclosed herein.

FIG. 6 shows a flowchart illustrating a method 600 that supports configurable flush operation speed in accordance with examples as disclosed herein. The operations of method 600 may be implemented by a memory system or its components as described herein.

For example, the operations of method 600 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 605, the method may include communicating, to a host system, one or more parameters associated with data stored in a first portion of a cache of the memory system, the cache including the first portion having a plurality of SLCs and one or more additional portions having a plurality of SLCs or a plurality of MLCs. The operations of 605 may be performed in accordance with examples as disclosed herein. In some examples, aspects of the operations of 605 may be performed by a parameter manager 425 as described with reference to FIG. 4.

At 610, the method may include receiving, from the host system and based at least in part on communicating the one or more parameters, an indication of a portion of the cache in the one or more additional portions for a flush operation. The operations of 610 may be performed in accordance with examples as disclosed herein. In some examples, aspects of the operations of 610 may be performed by a cache portion manager 430 as described with reference to FIG. 4.

At 615, the method may include writing, based at least in part on executing the flush operation, a subset of the data stored in the first portion of the cache to a second portion of the cache in the one or more additional portions of the cache based at least in part on receiving the indication of the portion of the cache. The operations of 615 may be performed in accordance with examples as disclosed herein. In some examples, aspects of the operations of 615 may be performed by a flush operation manager 435 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for communicating, to a host system, one or more parameters associated with data stored in a first portion of a cache of the memory system, the cache including the first portion having a plurality of SLCs and one or more additional portions having a plurality of SLCs or a plurality of MLCs, receiving, from the host system and based at least in part on communicating the one or more parameters, an indication of a portion of the cache in the one or more additional portions for a flush operation, and writing, based at least in part on executing the flush operation, a subset of the data stored in the first portion of the cache to a second portion of the cache in the one or more additional portions of the cache based at least in part on receiving the indication of the portion of the cache.

In some examples of the method 600 and the apparatus described herein, writing the subset of the data to the second portion may include operations, features, circuitry, logic, means, or instructions for writing the subset of the data to the indicated portion of the cache.

Some examples of the method 600 and the apparatus described herein may further include operations, features, circuitry, logic, means, or instructions for selecting, from the one or more additional portions of the cache, the second portion different than the indicated portion based at least in part on receiving the indication, where writing the subset of the data to the second portion may be based at least in part on the selecting.

Some examples of the method 600 and the apparatus described herein may further include operations, features, circuitry, logic, means, or instructions for selecting the second portion may be based at least in part on a first speed of the flush operation associated with the second portion, a second speed of the flush operation associated with the indicated portion, a first amount of available space within the second portion, a second amount of available space within the indicated portion, or any combination thereof.

In some examples of the method 600 and the apparatus described herein, the indication of the portion of the cache includes a value corresponding to one of a plurality of speeds for the flush operation and each of the one or more additional portions may be associated with a respective one the plurality of speeds.

In some examples of the method 600 and the apparatus described herein, a first additional portion of the cache in the one or more additional portions having a plurality of SLCs may be associated with a first speed for the flush operation from the plurality of speeds and a second additional portion of the cache in the one or more additional portions having a plurality of MLCs may be associated with a second speed for the flush operation from the plurality of speeds, the first speed being faster than the second speed.

In some examples of the method 600 and the apparatus described herein, the one or more parameters include an indication of a fragmentation of the data stored in the first portion of the cache, an indication of a percentage of the first portion of the cache storing valid data, or both.

In some examples of the method 600 and the apparatus described herein, receiving the indication may include operations, features, circuitry, logic, means, or instructions for reading an indication of the portion of the cache stored at a register coupled with the memory system.

In some examples of the method 600 and the apparatus described herein, receiving the indication may include operations, features, circuitry, logic, means, or instructions for reading an indication of the portion of the cache stored at a set of registers coupled with the memory system, where each register of the set of registers is associated with one of the one or more additional portions of the cache.

In some examples of the method 600 and the apparatus described herein, receiving the indication may include operations, features, circuitry, logic, means, or instructions for receiving a command to execute the flush operation, where the command includes the indication of the portion of the cache for the flush operation.

In some examples of the method 600 and the apparatus described herein, communicating the one or more parameters may include operations, features, circuitry, logic, means, or instructions for writing an indication of the one or more parameters to a register coupled with the memory system.

In some examples of the method 600 and the apparatus described herein, executing the flush operation may include operations, features, circuitry, logic, means, or instructions for identifying the subset of the data stored in the first portion of the cache based at least in part on the subset of the data including valid data, where writing the subset of the data may be based at least in part on the identifying and erasing the data stored in the first portion of the cache based at least in part on writing the subset of the data to the second portion of the cache.

Figure 7:
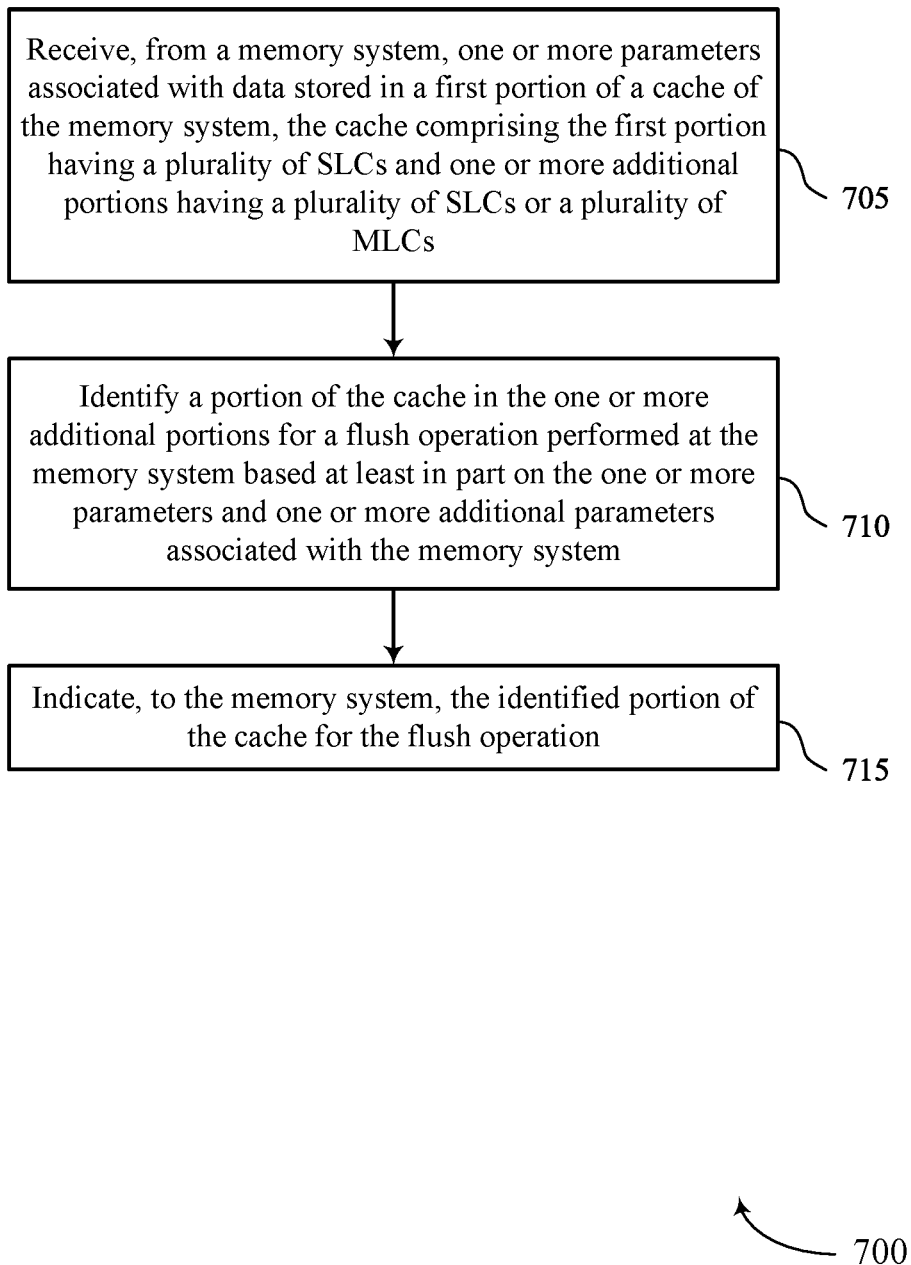

FIG. 7 shows a flowchart illustrating a method 700 that supports configurable flush operation speed in accordance with examples as disclosed herein. The operations of method 700 may be implemented by a host system or its components as described herein. For example, the operations of method 700 may be performed by a host system as described with reference to FIGS. 1 through 3 and 5. In some examples, a host system may execute a set of instructions to control the functional elements of the device to perform the described functions. Additionally or alternatively, the host system may perform aspects of the described functions using special-purpose hardware.

At 705, the method may include receiving, from a memory system, one or more parameters associated with data stored in a first portion of a cache of the memory system, the cache including the first portion having a plurality of SLCs and one or more additional portions having a plurality of SLCs or a plurality of MLCs. The operations of 705 may be performed in accordance with examples as disclosed herein. In some examples, aspects of the operations of 705 may be performed by a parameter receiver 525 as described with reference to FIG. 5.

At 710, the method may include identifying a portion of the cache in the one or more additional portions for a flush operation performed at the memory system based at least in part on the one or more parameters. The operations of 710 may be performed in accordance with examples as disclosed herein. In some examples, aspects of the operations of 710 may be performed by a cache portion identifier 530 as described with reference to FIG. 5.

At 715, the method may include indicating, to the memory system, the identified portion of the cache for the flush operation. The operations of 715 may be performed in accordance with examples as disclosed herein. In some examples, aspects of the operations of 715 may be performed by a cache portion indicator 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, from a memory system, one or more parameters associated with data stored in a first portion of a cache of the memory system, the cache including the first portion having a plurality of SLCs and one or more additional portions having a plurality of SLCs or a plurality of MLCs, identifying a portion of the cache in the one or more additional portions for a flush operation performed at the memory system based at least in part on the one or more parameters, and indicating, to the memory system, the identified portion of the cache for the flush operation.

In some examples of the method 700 and the apparatus described herein, indicating the identified portion of the cache may include operations, features, circuitry, logic, means, or instructions for writing a value to a register coupled with the memory system, where the value indicates the identified portion of the cache.

In some examples of the method 700 and the apparatus described herein, indicating the identified portion of the cache may include operations, features, circuitry, logic, means, or instructions for writing a value to a set of registers coupled with the memory system, where each register of the set of registers is associated with one of the one or more additional portions of the cache, and writing the value to one of the set of registers indicates the identified portion of the cache based on which of the one or more additional portions of the cache the one register is associated with.

In some examples of the method 700 and the apparatus described herein, indicating the identified portion of the cache may include operations, features, circuitry, logic, means, or instructions for transmitting a command to execute the flush operation, where the command indicates the identified portion of the cache for the flush operation.

In some examples of the method 700 and the apparatus described herein, identifying the portion of the cache for the flush operation may include operations, features, circuitry, logic, means, or instructions for identifying the portion of the cache based at least in part on a speed of the flush operation associated with the identified portion.

In some examples of the method 700 and the apparatus described herein, receiving the one or more parameters may include operations, features, circuitry, logic, means, or instructions for polling a register at the memory system, where the register stores an indication of the one or more parameters.

In some examples of the method 700 and the apparatus described herein, the indication of the portion of the cache includes a value corresponding to one of a plurality of speeds for the flush operation and each of the one or more additional portions may be associated with a respective one the plurality of speeds.

In some examples of the method 700 and the apparatus described herein, a first additional portion of the cache in the one or more additional portions having a plurality of SLCs may be associated with a first speed for the flush operation from the plurality of speeds and a second additional portion of the cache in the one or more additional portions having a plurality of MLCs may be associated with a second speed for the flush operation from the plurality of speeds, the first speed being faster than the second speed.

In some examples of the method 700 and the apparatus described herein, the one or more parameters include an indication of a fragmentation of the data stored in the first portion of the cache, an indication of a percentage of the first portion of the cache storing valid data, or both.

In some examples of the method 700 and the apparatus described herein, the apparatus may include operations, features, circuitry, logic, means, or instructions for identifying the portion of the cache for the flush operation based on or in response to one or more additional parameters, where the one or more additional parameters include a battery life associated with the memory system, a current location of the memory system, data associated with one or more previous flush operations at the memory system, a computational power of the memory system, or any combination thereof.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if," "when," "based on," or "based at least in part on" are used to describe a conditional action, a conditional process, or connection between portions of a process, the terms mays be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a cache comprising a first portion having a plurality of single-level cells and one or more additional portions having a plurality of single-level cells or a plurality of multi-level cells; and
a controller coupled with the cache and configured to cause the apparatus to:
write data to the first portion of the cache based at least in part on receiving a command;
communicate, to a host system, one or more parameters associated with the data stored in the first portion of the cache;
receive, from the host system after writing the data to the first portion of the cache and based at least in part on communicating the one or more parameters, an indication of a portion of the cache in the one or more additional portions for a flush operation; and
write, based at least in part on executing the flush operation, a subset of the data stored in the first portion of the cache to a second portion of the cache of the one or more additional portions of the cache based at least in part on receiving the indication of the portion of the cache.

2. The apparatus of claim 1, wherein writing the subset of the data to the second portion comprises:
writing the subset of the data to the indicated portion of the cache.

3. The apparatus of claim 1, wherein the controller is further configured to cause the apparatus to:
select, from the one or more additional portions of the cache, the second portion different than the indicated portion based at least in part on receiving the indication, wherein writing the subset of the data to the second portion is based at least in part on the selecting.

4. The apparatus of claim 3, wherein selecting the second portion is based at least in part on a first speed of the flush operation associated with the second portion, a second speed of the flush operation associated with the indicated portion, a first amount of available space within the second portion, a second amount of available space within the indicated portion, or any combination thereof.

5. The apparatus of claim 1, wherein:
the indication of the portion of the cache comprises a value corresponding to one of a plurality of speeds for the flush operation; and
each of the one or more additional portions is associated with a respective one the plurality of speeds.

6. The apparatus of claim 5, wherein:
a first additional portion of the cache in the one or more additional portions having a plurality of single-level cells is associated with a first speed for the flush operation from the plurality of speeds; and
a second additional portion of the cache in the one or more additional portions having a plurality of multi-level cells is associated with a second speed for the flush operation from the plurality of speeds, the first speed being faster than the second speed.

7. The apparatus of claim 1, wherein the one or more parameters comprise an indication of a fragmentation of the data stored in the first portion of the cache, an indication of a percentage of the first portion of the cache storing valid data, or both.

8. The apparatus of claim 1, wherein the controller is further configured to cause the apparatus to:
receive a second command to execute the flush operation, wherein the second command comprises the indication of the portion of the cache for the flush operation.

9. The apparatus of claim 1, wherein the controller is further configured to cause the apparatus to:
identify the subset of the data stored in the first portion of the cache based at least in part on the subset of the data comprising valid data, wherein writing the subset of the data is based at least in part on the identifying; and
erase the data stored in the first portion of the cache based at least in part on writing the subset of the data to the second portion of the cache.

10. An apparatus, comprising:
a cache comprising a first portion having a plurality of single-level cells and one or more additional portions having a plurality of single-level cells or a plurality of multi-level cells;
a controller coupled with the cache; and
a register coupled with the controller and configured to store an indication of a portion of the cache received from a host system, wherein the controller is configured to cause the apparatus to:
communicate, to a host system, one or more parameters associated with data stored in the first portion of the cache;
receive, from the host system after writing the data to the first portion of the cache and based at least in part on communicating the one or more parameters, the indication of the portion of the cache in the one or more additional portions for a flush operation;
read the indication of the portion of the cache stored at the register; and
write, based at least in part on executing the flush operation, a subset of the data stored in the first portion of the cache to a second portion of the cache in the one or more additional portions of the cache based at least in part on receiving the indication of the portion of the cache.

11. An apparatus, comprising:
a cache comprising a first portion having a plurality of single-level cells and one or more additional portions having a plurality of single-level cells or a plurality of multi-level cells;
a controller coupled with the cache; and
a set of registers coupled with the controller and configured to collectively store an indication of a portion of the cache received from a host system, wherein each register of the set of registers is associated with one of the one or more additional portions of the cache, and wherein the controller is configured to cause the apparatus:
communicate, to a host system, one or more parameters associated with data stored in the first portion of the cache;
receive, from the host system after writing the data to the first portion of the cache and based at least in part on communicating the one or more parameters, the indication of the portion of the cache in the one or more additional portions for a flush operation;
read the indication of the portion of the cache stored at the set of registers; and write, based at least in part on executing the flush operation, a subset of the data stored in the first portion of the cache to a second portion of the cache in the one or more additional portions of the cache based at least in part on receiving the indication of the portion of the cache.

12. An apparatus, comprising:
a cache comprising a first portion having a plurality of single-level cells and one or more additional portions having a plurality of single-level cells or a plurality of multi-level cells;
a controller coupled with the cache; and
a register coupled with the controller and configured to store an indication of one or more parameters associated with data stored in the first portion of the cache, wherein the controller is configured to cause the apparatus to:
write the indication of the one or more parameters to the register;
communicate, to a host system, the one or more parameters;
receive, from the host system after writing the data to the first portion of the cache and based at least in part on communicating the one or more parameters, an indication of the first portion of the cache in the one or more additional portions for a flush operation; and
write, based at least in part on executing the flush operation, a subset of the data stored in the first portion of the cache to a second portion of the cache in the one or more additional portions of the cache based at least in part on receiving the indication of the first portion of the cache.

13. An apparatus, comprising:
a controller configured to couple with a memory system, wherein the controller is configured to cause the apparatus to:
transmit, to the memory system, a command to write data to a first portion of a cache of the memory system, the cache comprising the first portion having a plurality of single-level cells and one or more additional portions having a plurality of single-level cells or a plurality of multi-level cells;
receive, from the memory system, one or more parameters associated with data stored in the first portion;
identify, after transmitting the command to write the data to the first portion of the cache, a portion of the cache in the one or more additional portions for a flush operation performed at the memory system based at least in part on the one or more parameters, the flush operation associated with writing a subset of the data stored in the first portion of the cache to a second portion of the cache of the one or more additional portions of the cache; and
indicate, to the memory system, the identified portion of the cache for the flush operation.

14. The apparatus of claim 13, wherein indicating the identified portion of the cache comprises:
transmitting a second command to execute the flush operation, wherein the second command indicates the identified portion of the cache for the flush operation.

15. The apparatus of claim 13, wherein identifying the portion of the cache for the flush operation comprises:
identifying the portion of the cache based at least in part on a speed of the flush operation associated with the identified portion.

16. The apparatus of claim 13, wherein:
indicating the portion of the cache comprises indicating a value corresponding to one of a plurality of speeds for the flush operation; and
each of the one or more additional portions is associated with a respective one the plurality of speeds.

17. The apparatus of claim 16, wherein:
a first additional portion of the cache in the one or more additional portions having a plurality of single-level cells is associated with a first speed for the flush operation from the plurality of speeds; and
a second additional portion of the cache in the one or more additional portions having a plurality of multi-level cells is associated with a second speed for the flush operation from the plurality of speeds, the first speed being faster than the second speed.

18. The apparatus of claim 13, wherein:
identifying the portion of the cache for the flush operation is based at least in part on one or more additional parameters; and
the one or more additional parameters comprise a battery life associated with the memory system, a current location of the memory system, data associated with one or more previous flush operations at the memory system, a computational power of the memory system, or any combination thereof.

19. An apparatus, comprising:
a controller configured to couple with a memory system, wherein the controller is configured to cause the apparatus to:
receive, from the memory system, one or more parameters associated with data stored in a first portion of a cache of the memory system, the cache comprising the first portion having a plurality of single-level cells and one or more additional portions having a plurality of single-level cells or a plurality of multi-level cells;
identify, after transmitting a command to write the data to the first portion of the cache, a portion of the cache in the one or more additional portions for a flush operation performed at the memory system based at least in part on the one or more parameters; and
write an indication of the identified portion of the cache to a register at the memory system to indicate, to the memory system, the identified portion of the cache for the flush operation.

20. An apparatus, comprising:
a controller configured to couple with a memory system, wherein the controller is configured to cause the apparatus to:
poll a register at the memory system, wherein the register stores an indication of one or more parameters associated with data stored in a first portion of a cache of the memory system;
receive, from the memory system, one or more parameters, the cache comprising the first portion having a plurality of single-level cells and one or more additional portions having a plurality of single-level cells or a plurality of multi-level cells;
identify, after transmitting a command to write the data to the first portion of the cache, a portion of the cache in the one or more additional portions for a flush operation performed at the memory system based at least in part on the one or more parameters; and
indicate, to the memory system, the identified portion of the cache for the flush operation.

21. A non-transitory computer-readable medium storing code at a memory system, the code comprising instructions executable by a processor to:
- write data to a first portion of a cache based at least in part on receiving a command, the cache comprising the first portion having a plurality of single-level cells and one or more additional portions having a plurality of single-level cells or a plurality of multi-level cells;
- communicate, to a host system, one or more parameters associated with data stored in the first portion;
- receive, from the host system after writing the data to the first portion of the cache and based at least in part on communicating the one or more parameters, an indication of a portion of the cache in the one or more additional portions for a flush operation; and
- write, based at least in part on executing the flush operation, a subset of the data stored in the first portion of the cache to a second portion of the cache of the one or more additional portions of the cache based at least in part on receiving the indication of the portion of the cache.

22. The non-transitory computer-readable medium of claim 21, wherein the instructions to write the subset of the data to the second portion are executable by the processor to:
- write the subset of the data to the indicated portion of the cache.

23. The non-transitory computer-readable medium of claim 21, wherein the instructions are further executable by the processor to:
- select, from the one or more additional portions of the cache, the second portion different than the indicated portion based at least in part on receiving the indication, wherein writing the subset of the data to the second portion is based at least in part on the selecting.

24. A non-transitory computer-readable medium storing code at a host system, the code comprising instructions executable by a processor to:
- transmit, to a memory system, a command to write data to a first portion of a cache of the memory system, the cache comprising the first portion having a plurality of single-level cells and one or more additional portions having a plurality of single-level cells or a plurality of multi-level cells;
- receive, from a memory system, one or more parameters associated with data stored in the first portion;
- identify, after transmitting the command to write the data to the first portion of the cache, a portion of the cache in the one or more additional portions for a flush operation performed at the memory system based at least in part on the one or more parameters, the flush operation associated with writing a subset of the data stored in the first portion of the cache to a second portion of the cache of the one or more additional portions of the cache; and
- indicate, to the memory system, the identified portion of the cache for the flush operation.

25. A non-transitory computer-readable medium storing code at a host system, the code comprising instructions executable by a processor to:
- receive, from a memory system, one or more parameters associated with data stored in a first portion of a cache of the memory system, the cache comprising the first portion having a plurality of single-level cells and one or more additional portions having a plurality of single-level cells or a plurality of multi-level cells;
- identify, after transmitting a command to write the data to the first portion of the cache, a portion of the cache in the one or more additional portions for a flush operation performed at the memory system based at least in part on the one or more parameters; and
- write an indication of the identified portion of the cache to a register at the memory system to indicate, to the memory system, the identified portion of the cache for the flush operation.

* * * * *